US009277137B1

(12) United States Patent
Coley et al.

(10) Patent No.: US 9,277,137 B1
(45) Date of Patent: *Mar. 1, 2016

(54) HIGH FRAME RATE INTERLEAVED IMAGERS

(71) Applicant: Rawles LLC, Wilmington, DE (US)

(72) Inventors: Christopher David Coley, Morgan Hill, CA (US); William Thomas Weatherford, San Mateo, CA (US); Robert Allan Yuan, Belmont, CA (US); Eric Gifford Marason, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,060

(22) Filed: Jun. 20, 2014

Related U.S. Application Data

(63) Continuation of application No. 13/166,588, filed on Jun. 22, 2011, now Pat. No. 8,797,439.

(51) Int. Cl.
*H04N 5/335* (2011.01)
*H04N 5/235* (2006.01)
*H04N 5/238* (2006.01)
*H04N 5/247* (2006.01)
*H04N 5/341* (2011.01)

(52) U.S. Cl.
CPC ............. *H04N 5/238* (2013.01); *H04N 5/2353* (2013.01); *H04N 5/247* (2013.01); *H04N 5/341* (2013.01)

(58) Field of Classification Search
CPC ............ H04N 5/2258; H04N 5/23232; H04N 5/2353; H04N 5/2354
USPC ......... 348/153, 211.11, 221.1, 320–324, 367, 348/376
See application file for complete search history.

(56) References Cited

U.S. PATENT DOCUMENTS

| | | | |
|---|---|---|---|
| 6,614,477 | B1 | 9/2003 | Lee et al. |
| 2004/0223058 | A1 | 11/2004 | Richter et al. |
| 2007/0097334 | A1 | 5/2007 | Damera-Venkata et al. |
| 2008/0129541 | A1 | 6/2008 | Lu et al. |
| 2011/0234807 | A1 | 9/2011 | Jones et al. |
| 2011/0242334 | A1 | 10/2011 | Wilburn et al. |

OTHER PUBLICATIONS

Office Action for U.S. Appl. No. 13/166,588, mailed on Nov. 4, 2013, Christopher Coley, "High Frame Rate Interleaved Imagers", 15 pages.

Pinhanez, "The Everywhere Displays Projector: A Device to Create Ubiquitous Graphical Interfaces", IBM Thomas Watson Research Center, Ubicomp 2001, 18 pages.

*Primary Examiner* — Trung Diep
(74) *Attorney, Agent, or Firm* — Lee & Hayes, PLLC (57) ABSTRACT

Two or more imagers having associated frame rates are each configured with a global shutter having an exposure interval less than a frame interval. The exposure interval for a first imager is offset from the exposure interval of a second imager such that the first imager is exposed while the second imager is not exposed. When interleaved, an effective frame rate exceeds the individual frame rates provided by the individual imagers. This interleaved imaging system may be used to recover, at high frame rates, images that are projected from spatial light modulators.

20 Claims, 8 Drawing Sheets

HIGH FRAME RATE INTERLEAVED IMAGERS

RELATED APPLICATIONS

The present application is a continuation of and claims priority to U.S. patent application Ser. No. 13/166,588 filed on Jun. 22, 2011, entitled "High Frame Rate Interleaved Imagers", which is incorporated by reference herein in its entirety.

BACKGROUND

Cameras and other imaging devices have a frame rate, or number of images per second which they are capable of capturing. Image capture devices operating at higher rates, in particular those above about 60 frames per second, typically experience a variety of drawbacks. These drawbacks include higher cost, reduced resolution, introduction of artifacts or distortion, and so forth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Electronic imaging devices, or imagers, are used in a variety of situations ranging from handheld consumer cameras to vision systems on an assembly line. Imagers are configured to acquire an image and then read out data about this image, such as to a memory device. Imagers may be described as having a particular frame rate, or number of complete image frames they are capable of capturing per second. For acquisition of full motion video, frame rates typically reside between 24 and 60 frames per second (fps). In some situations higher frame rates may be called for. For example, higher frame rates are useful when dealing with rapidly moving objects to minimize or eliminate motion artifacts.

Digital imagers may be operated in a "rolling shutter" mode. In the rolling shutter mode, also known as a "line scan", rows or columns of imaging pixels on the imager are read sequentially to generate an image during an exposure interval. As a result, each succeeding line of pixels is temporally different from the preceding line of pixels. Because the electronic "rolling shutter" does not require physical structures, they are generally inexpensive and simple to implement.

In contrast to a rolling shutter mode, a shutter operating in global mode (or a "global shutter") is configured so the entire imager is exposed and acquires an image for substantially the entire exposure interval, either electronically or by the physical shutter moving out of the optical path. Each pixel thus images the scene at the same time.

The electronic global shutter is configured to integrate the image at all pixels at substantially the same time. With the electronic global shutter, the imager may be continuously illuminated by the image, but configured to integrate the image during particular exposure times.

The physical global shutter physically blocks, redirects, or absorbs incident light such that the light does not fall upon the imager when in a closed state. These physical structures may include mechanical assemblies with moving parts, such as a leaf, diaphragm, and so forth. In other implementations, the physical structures may include solid-state assemblies, such as liquid crystals or light valves. These structures are either able to redirect a substantial portion of the incident light away from the imager, block, or absorb a substantial portion of the incident light before it reaches the imager.

Imagers are frequently configured to use rolling shutters because of their relatively low cost as well as other factors. However, because of the line scan inherent in the rolling shutter, moving objects or projected images generated by spatial light modulators may be distorted. For example, a fast moving ball or a projected image from a digital light projector using microelectromechanical systems (MEMS) devices may be improperly imaged. These distortions may include skew, smear, partial exposure, and so forth.

Skew occurs when the image appears to bend diagonally in one direction and results from relative motion between the camera with the rolling shutter and the object in the scene being imaged. For example, when taking a picture of a stationary telephone pole from a moving train, use of a rolling shutter would result in an image in which the telephone pole appears to lean to one side.

Smear occurs when an object in the image is moving at or near the speed at which the rolling shutter is read. For example, spokes on a spinning wheel may appear to thicken or disappear. Partial exposure of an image may also occur when the lighting conditions change within the exposure interval. For example, a flash may create a bright band in an image acquired with the rolling shutter if not synchronized with the rolling shutter.

Use of a global shutter prevents these distortions by exposing the entire imager (or at least a substantial portion thereof) at substantially the same time. For example, a physical global shutter may be configured to transition between open and closed states in less than $\frac{1}{1000}$ of a second, such as with a liquid crystal or mechanical shutter. The shutter may remain in the open and closed states for pre-determined periods of time. In some implementations the open and closed pre-determined periods of time may differ. Because the entire image is captured at substantially the same instant with the global shutter, there is no line scan effect to cause distortions.

As mentioned above, it may be desirable to capture images at higher frame rates. However, traditional high speed imagers are costly and, when using rolling shutters, introduce the distortions mentioned above. Described herein are devices and techniques for high-frame-rate, interleaved imaging systems. In these systems, two or more imagers having associated frame rates are each configured with a global shutter having an exposure interval less than a frame interval. The exposure interval for a first imager is offset from the exposure interval of a second imager such that the first imager is exposed while the second imager is not exposed. When interleaved, an effective frame rate exceeds the frame rate provided by the individual imagers. This interleaved imaging system may be used to recover images at high frame rates which are projected from spatial light modulators.

Illustrative Interleaved, High-Speed Imaging System

Figure 1:
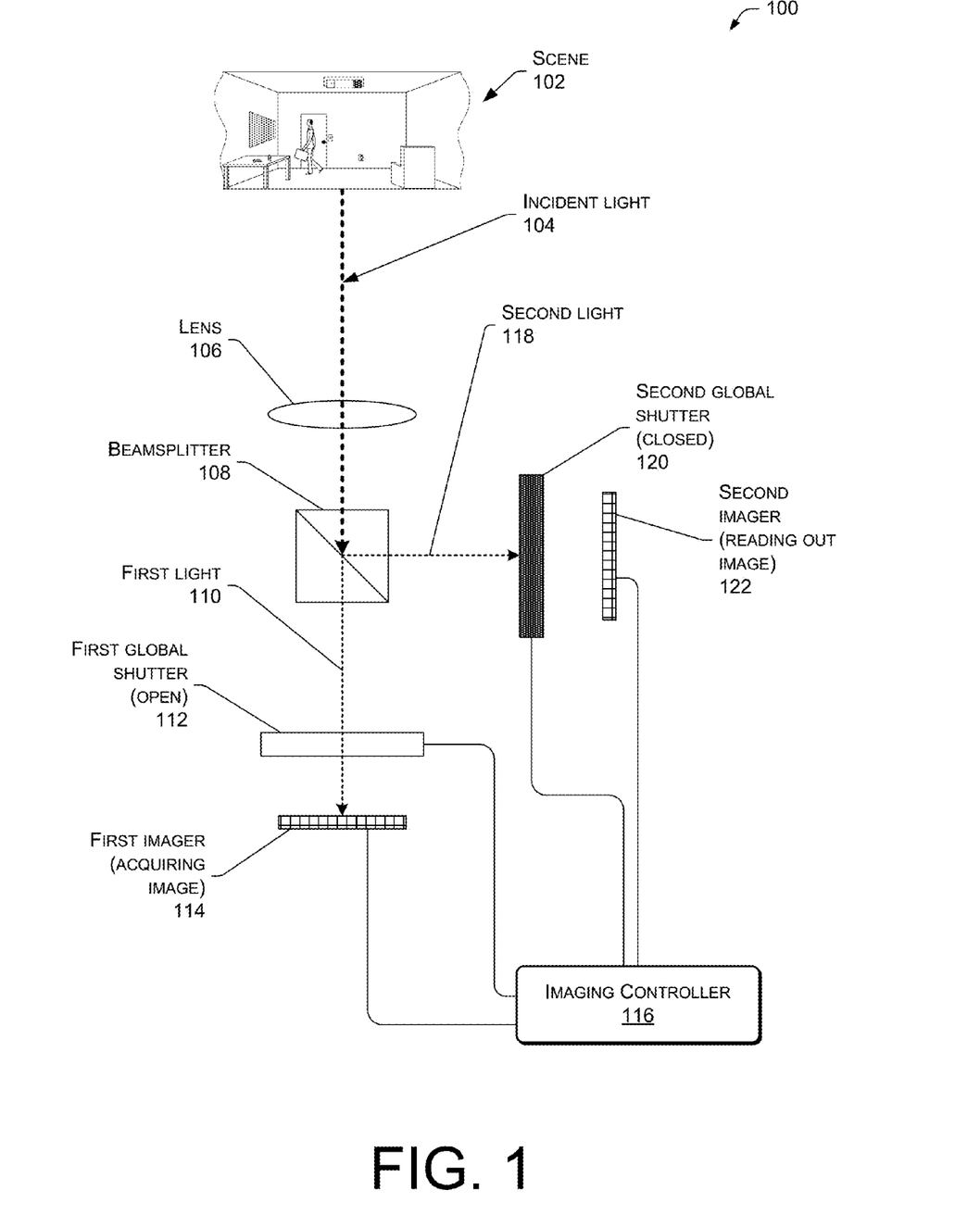
FIG. 1 shows an illustrative imaging system having two imagers each with a global shutter and configured to acquire high speed interleaved images.

FIG. 1 shows an illustrative imaging system 100. The system 100 is shown acquiring an image of a scene 102 with incident light 104 passing through one or more lenses 106 or other optical components. A beamsplitter 108 is configured to split the incident light 104. The beamsplitter 108 may comprise a prism, half-mirror, moveable mirror, cross prism (X-cube), and so forth.

A first light 110 ray, created in part by the beamsplitter 108 is shown passing through a first global shutter 112, which is depicted in an open state in this illustration. The global shutter may be configured to transition between an open state which transmits or allows incident light to pass and a closed state which blocks, absorbs, or re-directs incident light. The global shutter may comprise a solid-state device such as a liquid crystal or a mechanical assembly, such as one or more mechanical shutter leaves. The first light 110 that passes through the first global shutter 112 in the open state impinges upon a first imager 114. The imagers as used herein may include charge coupled devices (CCD), complementary metal oxide semiconductors (CMOS), photomultipliers, photodiode array, microbolometer, and so forth. The first imager 114 is configured to generate an image based at least in part upon impinging electromagnetic radiation of the first light 110. As shown here, the first imager 114 is acquiring a visible light image of the scene 102.

An imaging controller 116 couples to the first global shutter 112 and the first imager 114 and is configured to control the state of the shutter. This includes controlling exposure duration of the shutter, exposure frequency and timing of the shutter, and so forth. The imaging controller 116 may also be configured to control and/or drive the imager. This control may include setting or maintaining frame rates, initialization of the imager, read out of data, and so forth. For example, the imaging controller 116 may read image data from the imager and initialize the imager to acquire another image.

The beamsplitter 108 here is shown redirecting at least a portion of the incident light 104 along another path, shown by a second light ray 118. The second light 118 is directed towards a second-global-shutter 120 and a second imager 122. As shown here, the second-global-shutter 120 is in a closed or opaque state, preventing the passage of the second light 118 rays to the second imager 122. As a result, the second imager 122 is "dark" and does not see the image of the scene 102. During the time in which the second-global-shutter 120 is in the closed state, data from the second imager 122 may be read out by the imaging controller 116.

The imaging controller 116 also couples to the second-global-shutter 120 and the second imager 122. Further, the imaging controller 116 is configured to interleave exposure intervals during which the global shutter is in an open state across a plurality of global shutters. The imaging controller 116 may also interleave image acquisition and read out. In some implementations the imaging controller 116 may be configured to overlap the exposure intervals. Detailed discussion of this interleaving is below with regards to FIG. 2. By interleaving the image acquisition across a plurality of imagers, an interleaved, high-frame-rate image may be acquired. By controlling light to the entire imaging surface with the global shutter, this high-frame-rate image is also free from the distortions introduced by use of the rolling shutter.

Figure 2:
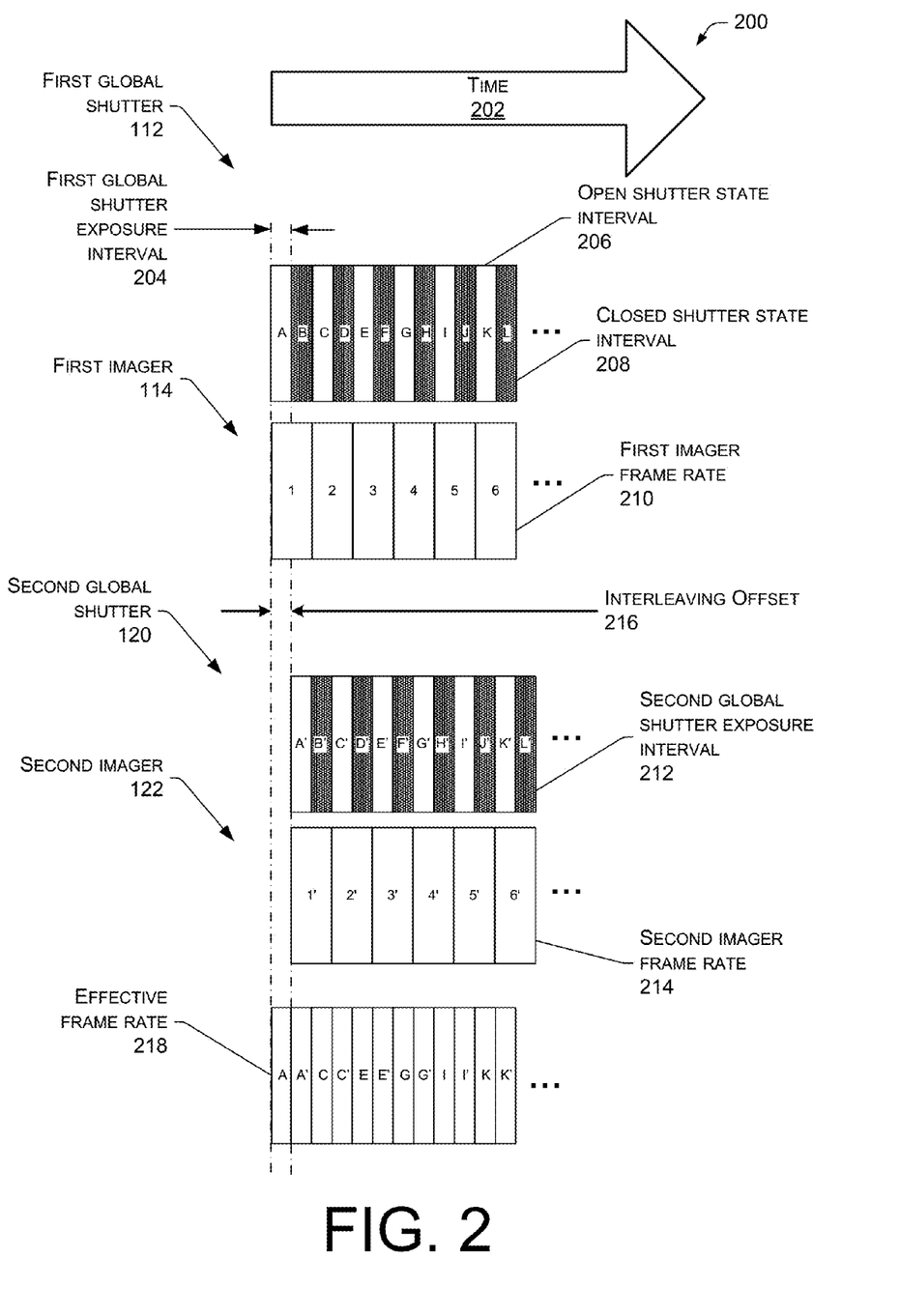
FIG. 2 illustrates frame and shutter states over time for the system of FIG. 1 and a corresponding effective frame rate resulting from interleaving.

FIG. 2 illustrates frame and shutter states 200 over time for the system 100 of FIG. 1. In this figure, time 202 increases from left to right as shown by the arrow.

The first global shutter 112 is shown having a first global shutter exposure interval 204. For example, this first shutter global exposure interval may be about $\frac{1}{120}$ of a second. The first global shutter 112 alternates between an open-shutter-state interval 206 and a closed-shutter-state interval 208. For example, a series of intervals designated A, B, C, D, E, F, G, H, I, J, K, L, . . . are shown. During intervals A, C, E, G, I, K, . . . the first global shutter 112 is in the open state. During intervals B, D, F, H, J, L, . . . the first global shutter 112 is in the closed state.

Also shown is the first imager 114 with a first-imager frame rate 210. The frame rate indicates how many images are acquired per second. The frame interval, or temporal duration of each frame, is generally the reciprocal of the frame rate. For example, the first-imager frame rate 210 may be about 60 frames per second, in which case the total duration of each frame is $\frac{1}{60}$ of a second. During each frame interval, the first imager 114 acquires an image, the image is read out, and the imager may be initialized to prepare to acquire a new image. A sequence of frames 1, 2, 3, 4, 5, 6 . . . is depicted.

The states of the second-global-shutter 120 and the second imager 122 are also shown. The second-global-shutter 120 here has a second-global-shutter exposure interval 212. For example, as shown here during intervals A', C', E', G', I', K', . . . the second global shutter 120 is in the open state. During intervals B', D', F', H', J', L', . . . the second global shutter 120 is in the closed state.

The second-global-shutter exposure interval 212 may be about equal to the first-global-shutter exposure interval 204 in some implementations. For example, as described above, the second-global-shutter exposure interval may be about $\frac{1}{120}$ of a second. In other implementations, the exposure intervals of the first and second-global-shutters may differ from one another. The frame rates between the first imager 114 and the second imager 122 may be about the same, or may differ from one another.

The second imager 122 is shown having a second-imager frame rate 214. A sequence of frames 1', 2', 3', 4', 5', 6', . . . is also depicted. For example, the second-imager frame rate 214 may be about 60 frames per second. In some implementations, the second-imager frame rate 214 may differ from the first imager frame 210.

As illustrated, the frames for the first imager 114 and the second imager 122 are offset by an interleaving offset 216. For example, as shown here the global-shutter exposure intervals are about $\frac{1}{120}$ of a second, while the frame duration is about $\frac{1}{60}$ of a second. The first imager 114 begins collecting frames at time zero, while the second imager 122 begins collecting frames $\frac{1}{120}$ of a second later. Thus, in the example shown here, the interleaving offset 216 is about $\frac{1}{120}$ of a second. The interleaving offset 216 may vary according to the number of imagers used, the time required for image acquisition and readout, and so forth.

The imaging controller 116 is configured to interleave the open-shutter-state interval 206 of the second-global-shutter 120 with the closed-shutter-state interval 208 of the first global shutter 112. The imaging controller 116 may be configured to maintain the interleaving offset 216 at least while imaging is in progress. As a result, an image of the scene 102 is imaged every 1/120 of a second, and data from one of the acquired images is available every 1/120 of a second. In some implementations, the shutter exposure interval is less than or equal to about 1/n of the frame rate of the individual imaging elements, where n equals a number of imaging elements. The shutter exposure intervals for the global shutters may be configured to overlap in some implementations.

The imaging controller 116 or another component or module may then take the stream of frames from the first imager 114 and the second imager 116 and interleave the frames to form an effective frame rate 218 which is greater than the individual frame rates of the imagers. Continuing this example, the effective frame rate 218 is 120 frames per second, corresponding to the new exposure resulting from the interleaved global shutter intervals A, A', C, C', E, E', G, G', I, I', K, K', . . . and so on.

In some implementations exposure intervals for a given shutter may vary. For example, the first global shutter 112 may be configured such that exposure interval A may be shorter than exposure interval B. These variable exposure intervals may be synchronized with a modulated light source. In another implementation the shutter exposure intervals may be further subdivided into shorter sub-interval exposure periods. For example, the exposure interval A may comprise three sub-intervals A1, A2, and A3. Each of these sub-intervals may be configured with different shutter states. For example, the shutter may be open during sub-intervals A1 and A3, and closed during A2. The sub-intervals may also be configured to vary in duration from one another. For example, sub-interval A1 may be 1/5 of the interval A, sub-interval A2 may be 3/5 of the interval A, and A3 may be 1/5 of the interval A.

Use of the global shutter eliminates distortions found in rolling shutters, and allows control of the acquired image at each imager for a given interval of time. When the image streams from each of the imagers are combined, a high effective frame rate 218 stream is available which is free from rolling shutter distortion.

Figure 3:
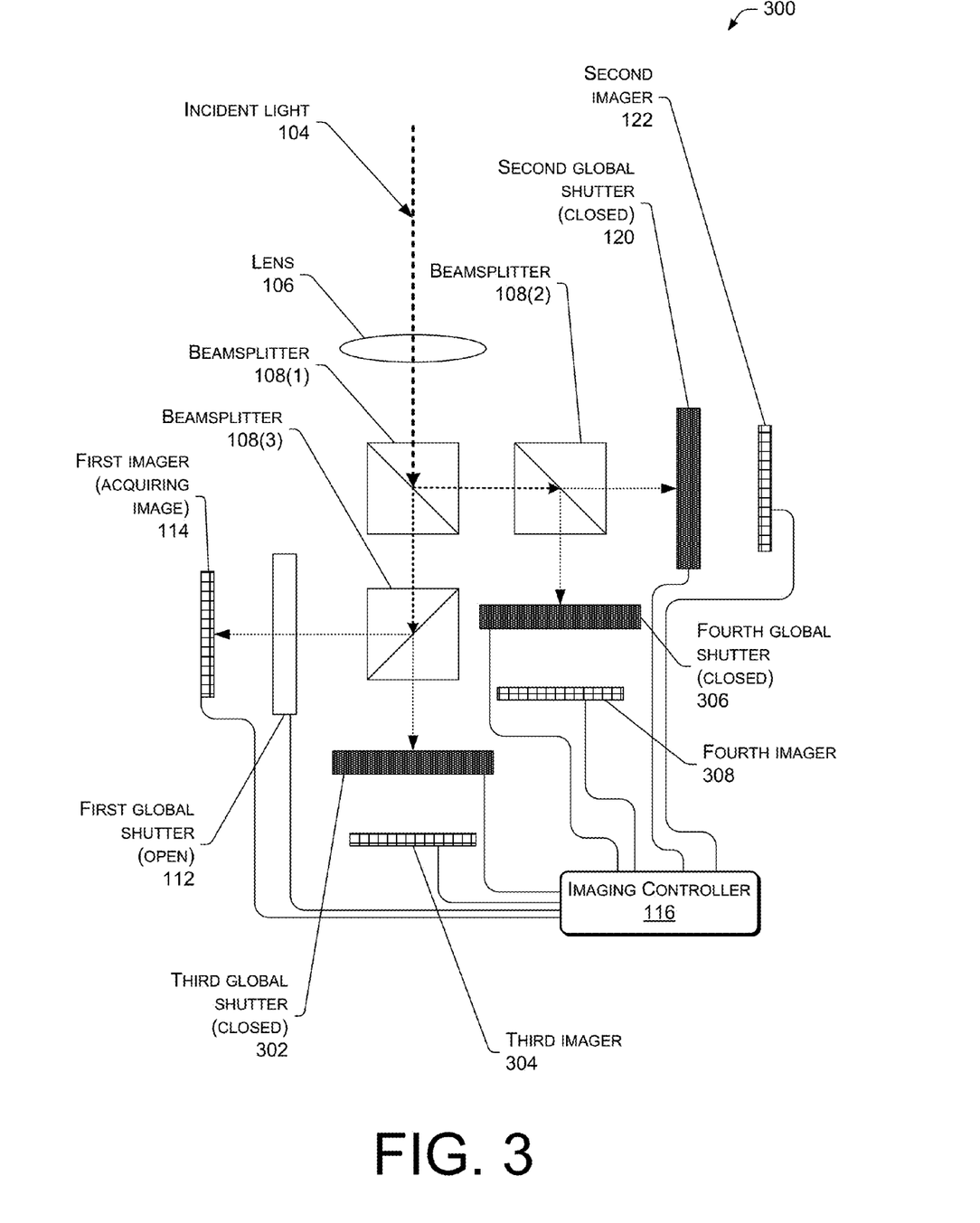
FIG. 3 shows an illustrative interleaved high-speed imaging system having four imagers each with a global shutter.

FIG. 3 shows an illustrative imaging system having four imagers 300. In some implementations high frames rates or additional spectral capabilities may call for additional imagers and corresponding arrangements for global shutter control for each imager. As such, while FIGS. 2 and 3 illustrate example imaging systems having two and four imagers, respectively, other embodiments may employ any other number of imagers.

As shown here, a series of beamsplitters 108(1)-(3) split the incident light 104 to form four rays. While individual beamsplitters are shown here, in some implementations a single component such as a cross prism may be used. Each of these rays is directed to a global shutter and associated imager. A first ray passes through the first global shutter 112 to the first imager 114. In this illustration, the first global shutter 112 is shown in the open state, allowing the ray to reach the first imager 114.

As before, the second-global-shutter 120 is in the closed state, preventing the ray from reaching the second imager 122. A third global shutter 302 is in a closed state preventing the ray from reaching the third imager 304. A fourth global shutter 306 is also closed and preventing light from reaching the fourth imager 308.

As depicted here, suppose each of the imagers is configured with individual imager frame rates of about 60 frames per second. In some implementations the individual imager frame rates may be between 30 and 240 frames per second. By setting the global shutter time interval for each global shutter to about 1/240 of a second and interleaving the frame rates and shutter states, an effective frame rate of about 240 frames per second may be achieved.

In another implementation, imagers with different capabilities may be coordinated and have global shutter times synchronized with one another. For example, the first imager 114 and the second imager 122 may be configured to acquire visible light images. The third imager 304 and the fourth imager 308 may be configured to acquire non-visible light images such as infrared or ultraviolet light images. The first global shutter 112 and the third global shutter 302 may be synchronized to be open at about the same time, allowing images of the scene to be captured in both visible and infrared light. Likewise the second-global-shutter 120 and the fourth global shutter 306 may be synchronized to be open at the same time.

In another implementation, the imagers may be configured to operated in monochrome visible light bands. For example, the first imager 114 may be configured to image red, while the second imager 122 may be configured to image green, and the third imager 304 may be configured to image blue. The fourth imager 308 may be configured to image non-visible light such as infrared light. A color wheel may also be used in conjunction with the global shutters to control which what band of light is being imaged by the imager.

As above, by interleaving the open states of these pairs of imagers, a higher effective frame rate may be achieved. Thus, while imagers are paired, an overall effective frame rate of 120 fps may be acquired, with those frames including visible and infrared images.

In some implementations the incident light 104 may be distributed to the plurality of imagers via a variable light distribution mechanism. For example, a moveable mirror, rotating mirror, spatial light modulator, and so forth may be used to selectively redirect the incident light 104 to one or more specified imagers at a particular time. In such an implementation, the global shutters may be omitted and their functionality replaced with the variable light distribution mechanism.

Other optical devices may also share at least a portion of the optical path of the imaging system 100. For example, one or more additional imaging elements may be configured to share at least a portion of the optical path. These additional one or more imaging elements may be configured such that they are free from a global shutter. In another example, an image may be projected from an image source onto the scene via at least part of the optical path of the imaging system 100. This image source may comprise an image projector, such as described below with regards to FIG. 4.

Figure 4:
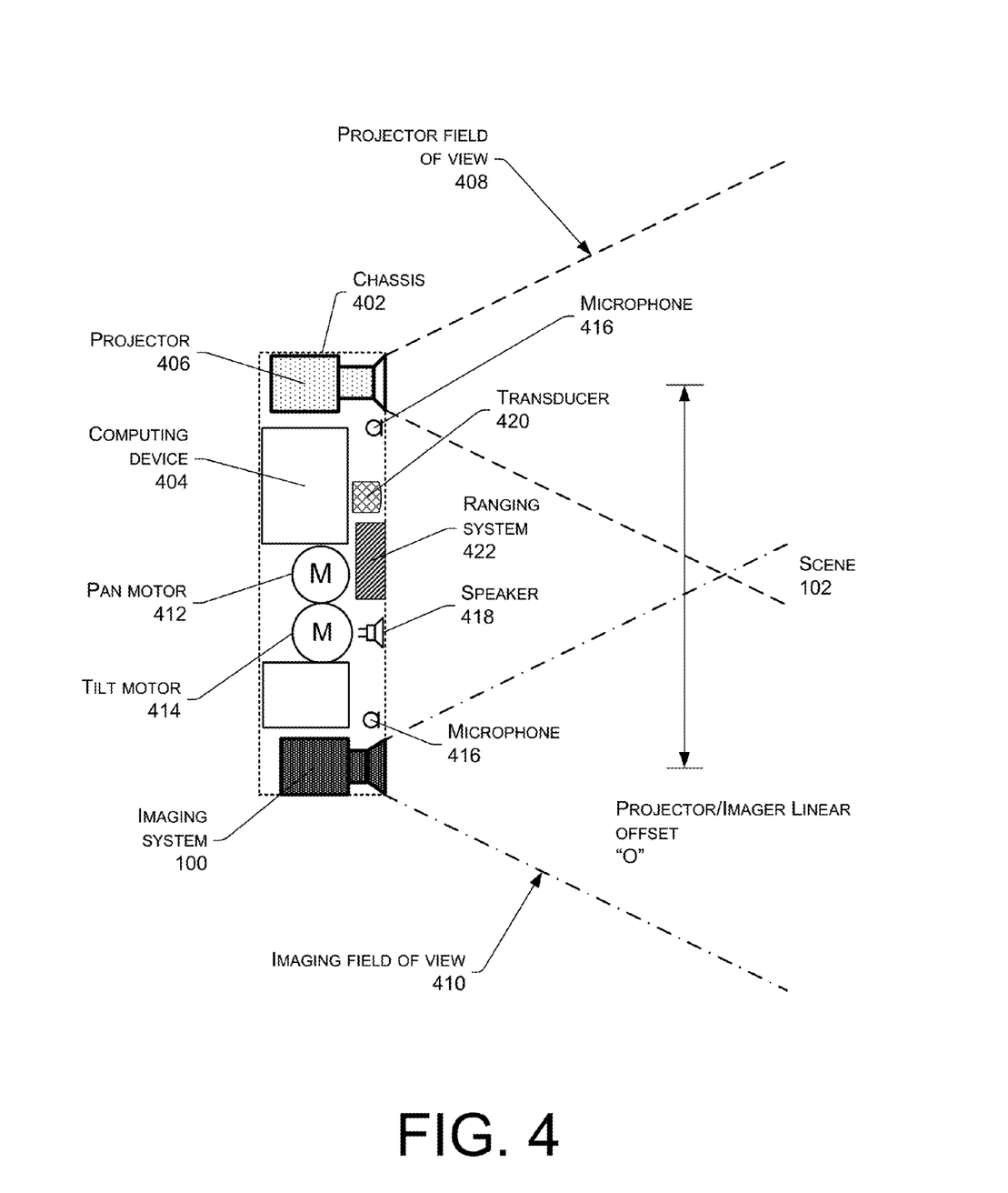
FIG. 4 shows an illustrative augmented reality functional node having the interleaved imaging system along with other selected components including a computing device.

FIG. 4 shows an illustrative augmented reality functional node 400 along with other selected components. The augmented reality functional node (ARFN) 400 is configured to support the generation and maintenance of an augmented reality environment. The augmented reality environment permits real objects and computer-generated representations to interact with one another. The ARFN 400 is configured to scan at least a portion of the scene 102 and the objects therein. This scan may include imaging the scene with the imaging systems described herein. The ARFN 400 may also be configured to provide output. The sensors and modules within the ARFN 400 characterize the scene as described herein.

Within a chassis 402 is a computing device 404 coupled to the devices internal and external to the chassis 402. The computing device is discussed below with regards to FIG. 5 in more detail.

Also within the chassis 402 is a projector 406 that generates and projects images into the scene 102. These images may be visible light images perceptible to the user, visible light images imperceptible to the user, images with non-visible light, or a combination thereof. In some implementations, these images may comprise structured light patterns. This projector 406 may be implemented with any number of technologies capable of generating an image and projecting that image onto a surface within the environment. Suitable technologies include a spatial light modulator including a digital micromirror device (DMD), liquid crystal on silicon display (LCOS), liquid crystal display, 3LCD, and so forth. The projector 406 has a projector field of view 408 which describes a particular solid angle. The projector field of view 408 may vary according to changes in the configuration of the projector. For example, the projector field of view 408 may narrow upon application of an optical zoom to the projector 406. In some implementations, a plurality of projectors 406 may be used.

The imaging system 100 may also be disposed within the chassis 402. The imaging system 100 has an imaging field of view 410 which describes a particular solid angle. The imaging field of view 410 may vary according to changes in the configuration of the imaging system 100. For example, an optical zoom of the imager may narrow the imaging field of view 410. In some implementations a plurality of imaging systems 100 may be used.

The chassis 402 may be mounted with a fixed orientation or be coupled via an actuator to a fixture such that the chassis 402 may move. Actuators may include piezoelectric actuators, motors, linear actuators, and other devices configured to displace or move the chassis 402 or components therein such as the projector 406 and/or the imaging system 100. The actuator may comprise a pan motor 412, tilt motor 414, and so forth. The pan motor 412 is configured to rotate the chassis 402 in a yawing motion. The tilt motor 414 is configured to change the pitch of the chassis 402. By panning and/or tilting the chassis 402, different views of the scene may be acquired.

One or more microphones 416 may be disposed within the chassis 402, or elsewhere within the scene. These microphones 416 may be used to acquire input from the user, for echolocation, location determination of a sound, or to otherwise aid in the characterization of and receipt of input from the scene. For example, the user may make a particular noise such as a tap on a wall or snap of the fingers to initiate an augmented reality function. The user may alternatively use voice commands.

One or more speakers 418 may also be present to provide for audible output. For example, the speakers 418 may be used to provide output from a text-to-speech module or to playback pre-recorded audio.

A transducer 420 may be present within the ARFN 400, or elsewhere within the environment, and configured to detect and/or generate inaudible signals, such as infrasound or ultrasound. These inaudible signals may be used to provide for signaling between accessory devices and the ARFN 400, for echolocation, and so forth.

A ranging system 422 may also be provided in the ARFN 400. The ranging system 422 is configured to provide distance information from the ARFN 400 to a scanned object, set of objects, surface, and so forth. The ranging system 422 may comprise radar, light detection and ranging (LIDAR), ultrasonic ranging, stereoscopic ranging, and so forth. In some implementations the transducer 420, the microphones 416, the speaker 418, or a combination thereof may be configured to use echolocation or echo-ranging to determine distance and spatial characteristics.

Also shown in this illustration is a projector/imager linear offset designated "O". This is a linear distance between the projector 406 and the imaging system 100. Placement of the projector 406 and the imaging system 100 at distance "O" from one another aids in the recovery of structured light data from the scene. Structured light is discussed in more detail below with regards to FIG. 5. The known projector/imager linear offset "O" may also be used to calculate distances, dimension objects, and otherwise aid in the characterization of objects within the scene 102. In other implementations the relative angle and size of the projector field of view 408 and imaging field of view 410 may vary. Also, the angle of the projector 406 and the imaging system 100 relative to the chassis 402 may vary.

In other implementations the components of the ARFN 400 may be distributed in one or more locations within the scene. As mentioned above, microphones 416 and speakers 418 may be distributed throughout the scene. The projector 406 and the imaging system 100 may also be located in separate chassis 402.

Figure 5:
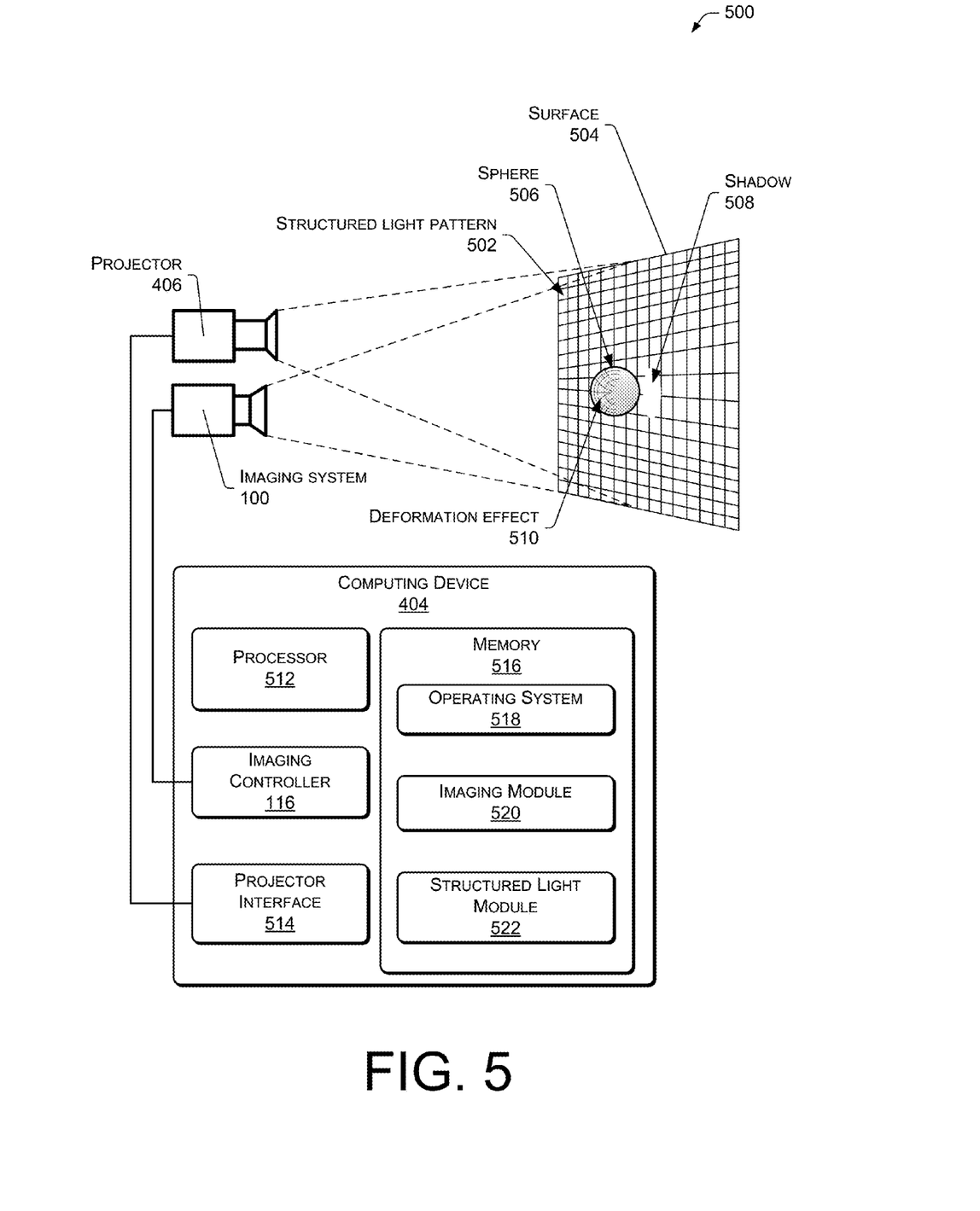
FIG. 5 shows a schematic of the computing device of FIG. 4 with other selected components including a structured light module.

FIG. 5 shows a schematic of the computing device 404 of FIG. 4 and structured light. As described above, the computing device 404 may couple to the projector 406 and the imaging system 100. The projector 406 is configured to produce an image during operation. In some implementations multiple projectors 502 may be used. In some implementations, the image may be a structured light pattern 502 as shown here. As shown here, the structured light pattern 502 is projected onto the scene, such as a surface 504. The structured light pattern 502 shown in this example is a grid. However, in other implementations other structured light patterns may be used, such as a pseudorandom noise pattern. The structured light pattern 502 may also be varied. For example, a first structured light pattern may be used at a first time, a second structured light pattern may be used at a second time, and so forth.

A sphere 506 is shown positioned between the projector 406 and the surface 504. A shadow 508 from the sphere 506 is shown on the surface 504. Also shown is a deformation effect 510 of the structured light pattern 502 as it interacts with the curved surface of the sphere 506.

This deformation effect 510 may be detected by the imaging system 100. The imaging system 100 is configured to sense or detect the light. As described above, in some implementations the imaging system 100 may also sense or detect non-visible light, allowing for multi-spectral imaging of the target. Other effects on the structured light pattern 502 may also be used. For example, a dispersion pattern of points in the structured light pattern 502 may provide details about the scene.

The images captured by the imaging system 100 is processed by the computing device 404 to determine physical attributes about the scene. The computing device 404 may comprise one or more processors 512, the imaging controller 116, a projector interface 514, and a memory 516. The memory may store an operating system 518, an imaging module 520, and a structured light module 522. In some implementations, the resources among a plurality of computing devices 404 may be shared. These resources may include input/output devices, processors 512, memory 516, and so forth.

The projector interface 514 may be configured to couple the computing device 404 to the projector 502 and the imaging system 100. The coupling between the computing device 404 and the external devices such as the projector 406 and the imaging system 100 may be via wire, fiber optic cable, wireless, and so forth.

The memory 516 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

The operating system module 518 is configured to manage processes executing on the processor 512 and associated resources. The imaging module 520 is configured to control the imaging system 100 via the imaging controller 116. This control may include configuration of frame rates, exposure intervals, image alignment, image interleaving, interleaving offset 216, and so forth. In some implementations image interleaving may be performed at least in part by the imaging controller 116, the imaging module 520, or a combination thereof.

The structured light module 522 is configured to analyze the structured light as projected by the projector 406 with the structured light data gathered by the imaging system 100 to determine characteristics about the topology of the scene.

While these modules are described as being stored such as in the memory 516 and executed by the processor 512, it is understood that in some implementations all or part of the functions provided by these modules may be performed by devices such as application-specific integrated circuits, field programmable gate arrays, or other dedicated circuitry.

Illustrative Interleaved Imaging Process

The following processes may be implemented by the architectures herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 6:
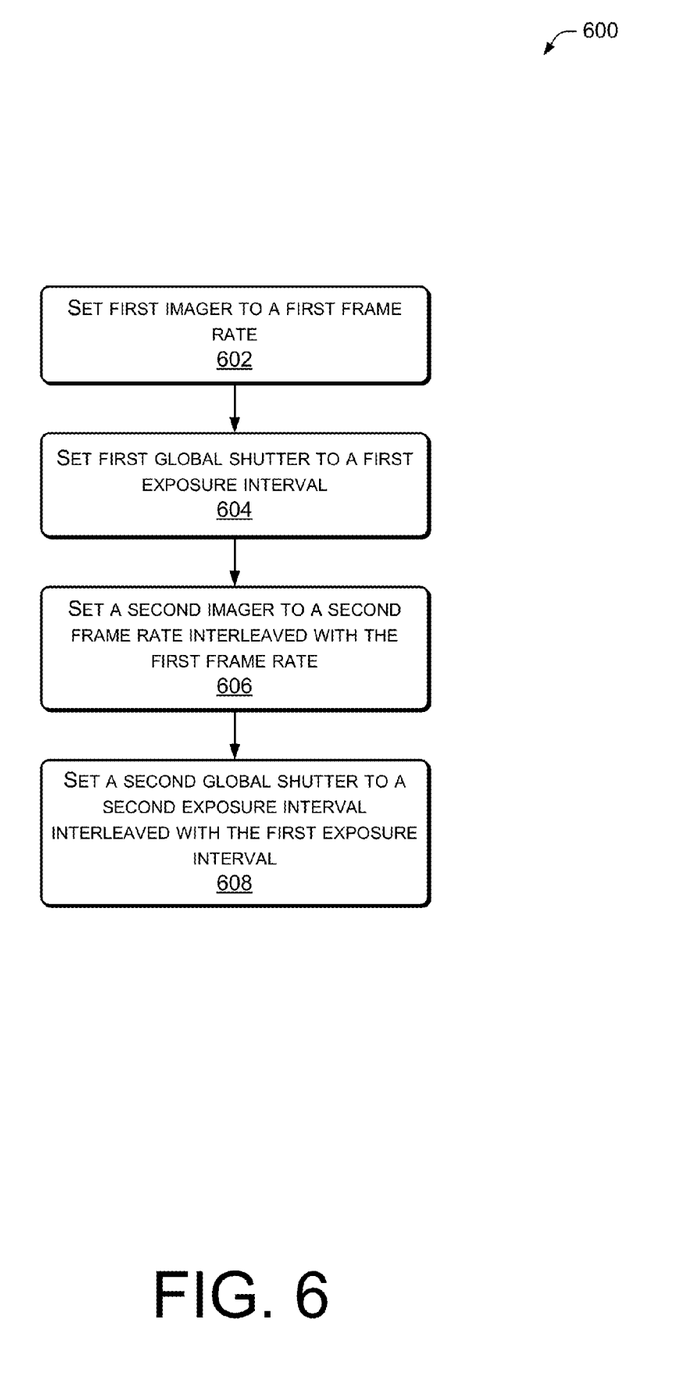
FIG. 6 is an illustrative process of configuring a plurality of imaging elements and global shutters to generate interleaved images.

FIG. 6 is a process 600 of configuring a plurality of imaging elements and global shutters to generate interleaved images. In some implementations the imaging controller 116 may provide the configuration and timing for the following operations. The following process is described with respect to a pair of imagers, however it is understood that in other implementations more than two imagers may be present with the process adjusted to correspond.

At 602, a first imager is set to a first frame rate, such as 60 frames per second. In some implementations, the frame rate may be synchronized with one or more image projectors, ambient lighting fixtures, power supply frequency, and so forth. At 604, a first global shutter is set to a first exposure interval. For example, the exposure interval may be about $1/120$ of a second.

At 606, a second imager is set to a second frame rate, where the second frame rate is interleaved with the first frame rate. This interleaving may comprise a displacement of the frame rates by the interleaving offset 216. For example, where the frame rates are 60 frames per second and the exposure interval $1/120$ of a second, the interleaving offset may be $1/120$ of a second.

At 608, a second-global-shutter is set to a second exposure interval and interleaved with the first exposure interval. As described above for the case of the imaging system 100 in FIG. 1, where one global shutter is open, the other is closed.

Figure 7:
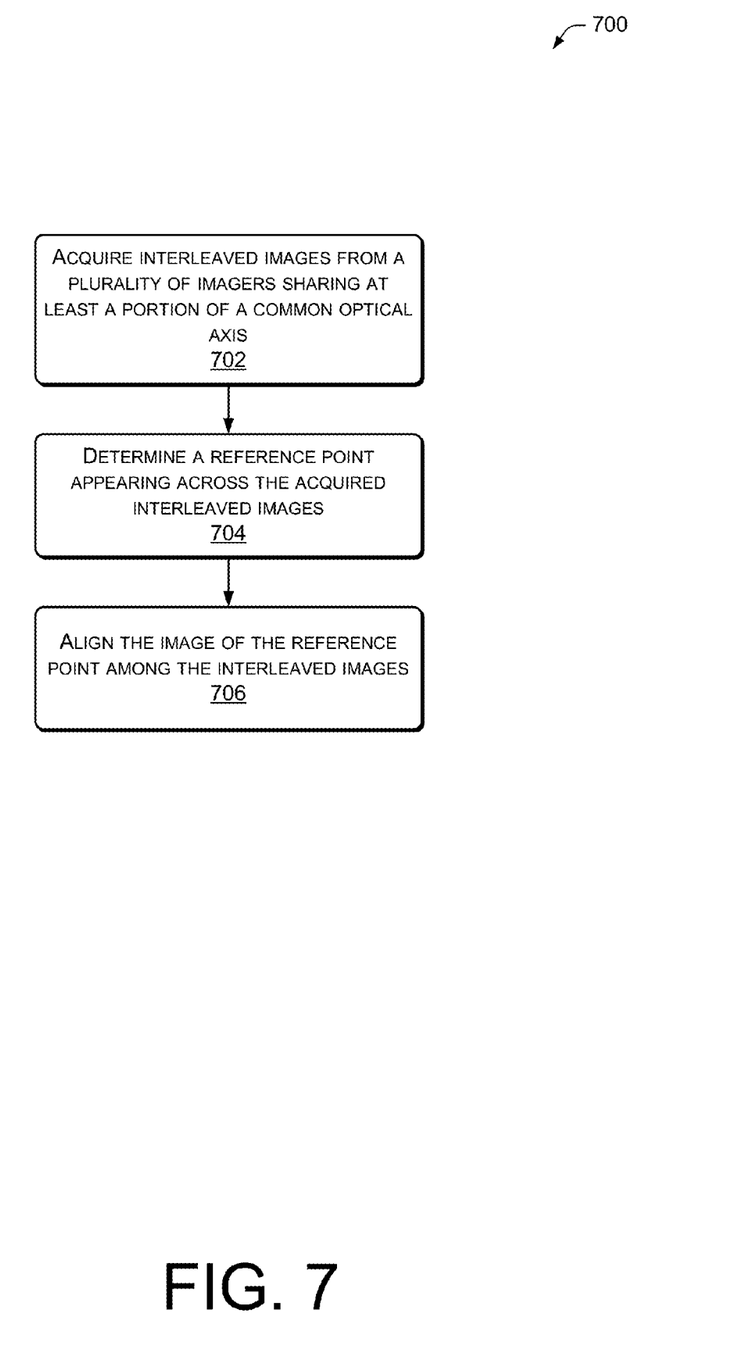
FIG. 7 is an illustrative process of aligning the plurality of imagers in the interleaved imaging system.

FIG. 7 is a process 700 of aligning the plurality of imagers. Alignment of the imagers or acquired images produced by the imagers may be desired to prevent jitter or instability in a resulting stream of images from the interleaved imagers. The imaging controller 116 may use the following process to provide this alignment.

At 702, interleaved images from a plurality of imagers which share at least a portion of a common optical axis are acquired. For example, images acquired by the first imager 114 and the second imager 122 of the scene 102 via the lens 106.

At 704, a reference point appearing across the acquired interleaved images is determined. This reference point may be a physical object within the scene 102, or a projected element. The reference point may be selected from relatively stationary objects within the scene, for example, features which are within a pre-determined number of pixels of one another in successive frames. In some implementations a plurality of reference points may be used as well. These reference points may be distributed throughout the frame or from a designated region in the frame such a 300×300 pixels in the center.

At 706, the image of the reference point among the interleaved images is aligned. This alignment may involve a physical positioning of one or more of the imagers or an electronic shift in the acquired images. For example, in the following discussion, consider where the two images from the two imagers of the imaging system 100 are misaligned by three pixels along the horizontal axis.

Mechanical alignment may involve one of the imagers to be shifted a few micrometers to the left corresponding to the three pixel misalignment. In some implementations each of the imagers may be configured to be moved for alignment, while in other implementations one or more of the imagers may be fixed while others move. Imagers may be configured to move in one or more axes.

Electronic alignment may involve shifting columns or rows of pixels to bring the reference point into coincidence. One or both of the interleaved images may be shifted. Such alignment removes the need for physical positioning but may result in blank spots around the edges of the image when the required shifting is significant.

Figure 8:
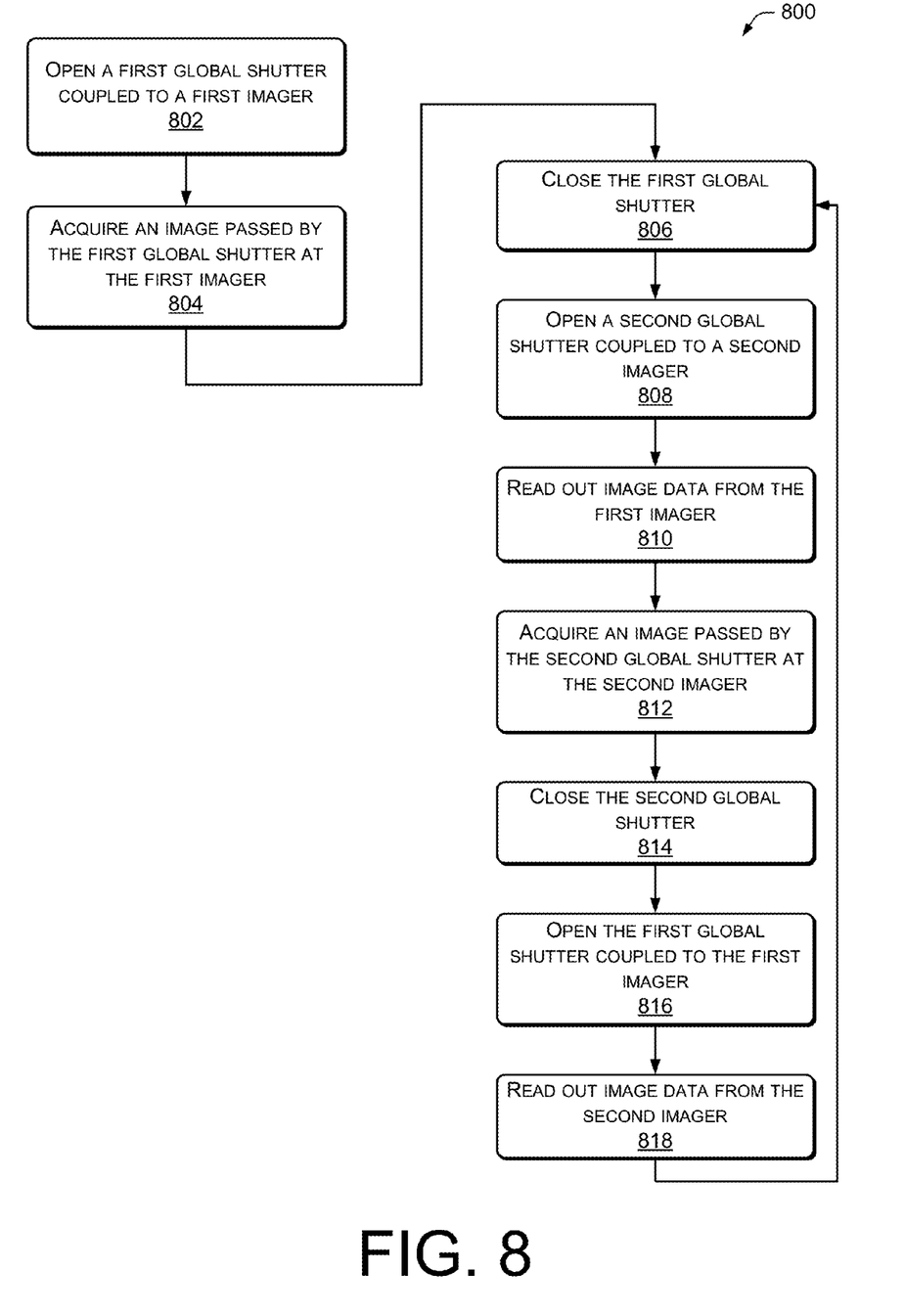
FIG. 8 is an illustrative process of acquiring high speed interleaved images.

FIG. 8 is a process 800 of acquiring high-speed, interleaved images. As described above, this process may be controlled in some implementations by the imaging controller 116. The following process is described with respect to a pair of imagers, however it is understood that in other implementations more than two imagers may be present with the process adjusted to correspond.

At 802, the first global shutter 112 coupled to a first imager 802 is opened. This allows light rays from the scene 102 to reach the first imager 114. At 804, an image is acquired by the first imager 114 as passed through the first global shutter 102. At 806, the first global shutter 112 transitions to a closed state, blocking or redirecting the incident light rays from the first imager 114.

At 808, the second-global-shutter 120 which is coupled to the second imager 122 is transitioned to an open state. At 810, image data from the first imager 114 is read out.

At 812, an image is acquired by the second imager 122 as passed through the second-global-shutter 120. At 814, the second-global-shutter 120 transitions to a closed state.

At 816, the first global shutter 112 which is coupled to the first imager 114 is transitioned back to an open state. At 818, the image data is read out from the second imager 122. The process may then continue back to 806 and operate in a loop, acquiring interleaved images.

As described above, the imaging controller 116 or another module may take the streams of images acquired by each of the imagers and interleave them. Once interleaved, image data with the higher effective frame rate is available.

Conclusion

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An imaging system comprising:
   a first global shutter coupled to a first imager having a first frame rate;
   a second global shutter coupled to a second imager having a second frame rate; and
   an imaging controller configured to:
      capture first image data from the first imager based on a first exposure interval of the first global shutter with a duration less than the first frame rate;
      capture second image data from the second imager based on a second exposure interval of the second global shutter with a duration less than the second frame rate; and
      interleave the first exposure interval and the second exposure interval to generate an effective frame rate greater than the first frame rate or the second frame rate.

2. The system of claim 1, wherein the first exposure interval and the second exposure interval overlap.

3. The system of claim 2, wherein the first exposure interval is offset from the second exposure interval such that the first image data is captured while the second image data is not captured.

4. The system of claim 1, wherein the global shutters are configured to: (1) expose substantially all of an imaging portion of the respective imager at about the same time during the first exposure interval and the second exposure interval, and (2) substantially prevent exposure of the imaging portion of the respective image outside the first exposure interval and the second exposure interval.

5. The system of claim 1, wherein the global shutters comprise electronic global shutters configured to continually pass illumination to a respective imager.

6. The system of claim 1, wherein the first frame rate and the second frame rate are about the same value but offset from one another by a pre-determined interleaving offset time interval.

7. The system of claim 1, wherein the first frame rate and the second frame rate are about 60 frames per second and the first and second exposure intervals are about 1/120 of a second.

8. The system of claim 1, wherein the imaging controller is further configured to recover an image comprising a projected image; and further comprising a spatial light modulator configured to project at least a portion of the projected image.

9. The system of claim 8, wherein the spatial light modulator comprises a digital micromirror device.

10. The system of claim 8, wherein the projected image comprises structured light.

11. The system of claim 8, wherein the effective frame rate is between about 60 frames per second and about 240 frames per second.

12. An imaging system comprising:
    a plurality of imaging elements configured to share at least a portion of an optical path, each of the plurality of imaging elements being coupled to a respective global shutter to pass illumination to each of the plurality of imaging elements; and
    an imaging controller configured to interleave respective exposure times of the global shutters across the plurality of imaging elements to generate a frame rate greater than an individual frame rate for each of the plurality of imaging elements.

13. The system of claim 12, further comprising an additional one or more imaging elements configured to share at least a portion of the optical path, the additional one or more imaging elements being free from a global shutter.

14. The system of claim 12, wherein a shutter exposure interval of the global shutters is less than or equal to about 1/n of the frame rate of the plurality of imaging elements where n equals a number of imaging elements.

15. The system of claim 12, wherein one or more of the plurality of imagers are configured to detect infrared light.

16. The system of claim 12, further comprising a spatial light modulator configured to generate a projected image detectable at least in part by the plurality of imaging elements.

17. One or more non-transitory computer-readable media storing computer-executable instructions that, when executed, cause one or more processors to perform acts comprising:
    setting a first global shutter coupled to the first imager having a first frame rate to a first exposure interval, the first global shutter configured to pass illumination to the first imager; and
    setting a second global shutter coupled to a second imager having a second frame rate interleaved with the first frame rate to a second exposure interval, the second global shutter configured to pass illumination to the second imager and the second exposure interval alternates with the first exposure interval to generate an effective frame rate greater than the first frame rate and greater than the second frame rate.

18. The one or more non-transitory computer-readable storage media of claim 17, further comprising:
    acquiring interleaved images from the first and second imagers which share at least a portion of a common optical axis;
    determining a reference point appearing across the acquired interleaved images; and
    aligning the image of the reference point among the interleaved images.

19. The one or more non-transitory computer-readable storage media of claim 18, wherein the aligning comprises shifting electronically the interleaved images.

20. The one or more non-transitory computer-readable storage media of claim 18, wherein the aligning comprises mechanically shifting the first imager, second imager, or both the first and second imagers.

* * * * *